US008983554B2

(12) United States Patent
Mankaruse et al.

(10) Patent No.: US 8,983,554 B2
(45) Date of Patent: Mar. 17, 2015

(54) MOBILE WIRELESS COMMUNICATIONS DEVICE WITH RF IMMUNE CHARGING CONTACTS

(75) Inventors: George Mankaruse, Kitchener (CA); Lizhong Zhu, Waterloo (CA); Michael Corrigan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1634 days.

(21) Appl. No.: 12/173,037

(22) Filed: Jul. 15, 2008

(65) Prior Publication Data

US 2010/0016033 A1 Jan. 21, 2010

(51) Int. Cl.
*H04M 1/00* (2006.01)
*H04B 1/04* (2006.01)

(52) U.S. Cl.
CPC ...... *H04B 1/0483* (2013.01); *H04B 2001/0491* (2013.01)
USPC .......................... 455/573; 455/572; 455/575.1

(58) Field of Classification Search
CPC .. H04B 1/3883; H04B 1/3838; H04B 5/0075; H04B 2001/0491; H04B 1/0483
USPC ............ 455/572, 573, 575.5, 575.7; 320/114; 343/702, 841, 906
See application file for complete search history.

(56) References Cited

U.S. PATENT DOCUMENTS

| | | | |
|---|---|---|---|
| 5,132,645 A | 7/1992 | Mayer | 333/109 |
| 5,389,890 A | 2/1995 | Burrage | 330/124 |
| 6,049,725 A | 4/2000 | Emmert et al. | 455/573 |
| 6,519,448 B1 | 2/2003 | Dress et al. | 455/41 |
| 6,760,010 B1 | 7/2004 | Webb | 345/168 |
| 7,157,965 B1 | 1/2007 | Kim | 330/124 |
| 2004/0087322 A1 | 5/2004 | Aasgaard | 455/462 |
| 2004/0209598 A1* | 10/2004 | Beamish et al. | 455/410 |
| 2006/0068856 A1* | 3/2006 | Zhu et al. | 455/575.1 |
| 2007/0004456 A1* | 1/2007 | Shimada | 455/558 |

(Continued)

FOREIGN PATENT DOCUMENTS

| | | | | |
|---|---|---|---|---|
| JP | 05134147 | 5/1993 | | G02B 6/42 |
| JP | 2005086939 | 3/2005 | | H02J 7/00 |

(Continued)

OTHER PUBLICATIONS

Wikipedia definition of "ferrite bead".*

(Continued)

*Primary Examiner* — George Eng
*Assistant Examiner* — Jing Gao
(74) *Attorney, Agent, or Firm* — Allen, Dyer, Doppelt, Milbrath & Gilchrist, P.A.

(57) ABSTRACT

In accordance with a non-limiting aspect, a mobile wireless communications device includes a housing, at least one circuit board carried by the housing, radio frequency (RF) circuitry, and a processor. An antenna is operative with the RF circuitry. A charging circuit charges a battery carried by and powers the device and includes at least one charging contact carried by the housing and configured for engaging an external charging cradle when connected thereto. It includes an internal connector extending to at least one circuit board and connecting to the charging circuitry. An RF filter includes a ferrite material surrounding at least a portion of the internal connector to minimize RE coupling from the at least one charging contact to the antenna and reduce transmitter harmonics emission and receiver de-sense.

19 Claims, 11 Drawing Sheets

(56) References Cited

U.S. PATENT DOCUMENTS

2008/0037765 A1* 2/2008 Finney et al. ............... 379/368
2008/0166175 A1* 7/2008 Pittel et al. .................. 401/195
2008/0316117 A1* 12/2008 Hill et al. .................... 343/702

FOREIGN PATENT DOCUMENTS

| JP | 2006011310 | 1/2006 | ............. G02F 1/133 |
| WO | 2006/001557 | 1/2006 | ............... H02J 7/02 |

OTHER PUBLICATIONS

Solbach et al., "*Linearized Combiner Circuits for Power- and Low Noise-Amplifier Applications,*" Universitat Duisburg-Essen, 3 pages.

Luong et al., "*Design of a Full-Custom Accurate I-Q Modulator,*" Proceedings of EPAC 2004, Lucerne, Switzerland, pp. 2029-2031.

Ashtiani et al., "*Direct Multilevel Carrier Modulation Using Millimeter-Wave Balanced Vector Modulators,*" IEEE Transactions on Microwave Theory and Techniques, vol. 46, No. 12, Dec. 1998, pp. 2611-2619.

Grebennikov et al., "*High-Efficiency Balanced Switched-Path Monolithic SiGe HBT Power Amplifiers for Wireless Applications,*" Proceedings of the 37th European Microwave Conference, Oct. 2007, Munich, Germany, pp. 1189-1192.

Andre et al., "*High Efficiency, High Linearity GaN HEMT Amplifiers for WiMAX Applications,*" High Frequency Electronics, Jun. 2007, pp. 16, 18, 20, 22, 24, 25, 26, 28, 29.

* cited by examiner

MOBILE WIRELESS COMMUNICATIONS DEVICE WITH RF IMMUNE CHARGING CONTACTS

FIELD OF THE INVENTION

The present invention relates to the field of communications devices, and more particularly, to mobile wireless communications devices and related methods.

BACKGROUND OF THE INVENTION

Cellular communication systems continue to grow in popularity and have become an integral part of both personal and business communications. Cellular telephones allow users to place and receive phone calls most anywhere they travel. Moreover, as cellular telephone technology is increased, so too has the functionality of cellular devices. For example, many cellular devices now incorporate Personal Digital Assistant (PDA) features such as calendars, address books, task lists, calculators, memo and writing programs, etc. These multi-function devices usually allow users to send and receive electronic mail (email) messages wirelessly and access the internet via a cellular network and/or a wireless local area network (WLAN), for example.

As the functionality of cellular communications devices continues to increase, so too does demand for smaller devices that are easier and more convenient for users to carry. The circuit boards and associated electronic components thereon are becoming increasingly reduced in size and placed closer together. These components include antennae, RF components, power amplifiers, antenna switches, and other electronic components that pick up conductive energy and create interference within various circuits and components. For example, some components could pick up conducted energy directly from a power amplifier circuit, the charging contacts of a battery, antenna contacts, or from the radiated energy emitted by an antenna. This unwanted reception of conducted or near field radiated energy from power amplifiers, antennae or other components is particularly problematic in a packet burst transmission as part of a Global System for Mobile communications (GSM) system, including the 450 MHz, 900 MHz, 1800 MHz and 1900 MHz frequency bands. Other issues arise with modulation schemes that use In-phase (I) and Quadrature (Q) circuits, creating linearity issues with power amplifiers and poor antenna match. This can cause degradation of TRP (total radiated power) and raise harmonic interference issues because of the higher non-linearity of a power amplifier as an example.

BRIEF DESCRIPTION OF THE DRAWINGS

Other objects, features and advantages will become apparent from the detailed description which follows, when considered in light of the accompanying drawings in which.

DETAILED DESCRIPTION OF THE PREFERRED EMBODIMENTS

Figure 1:
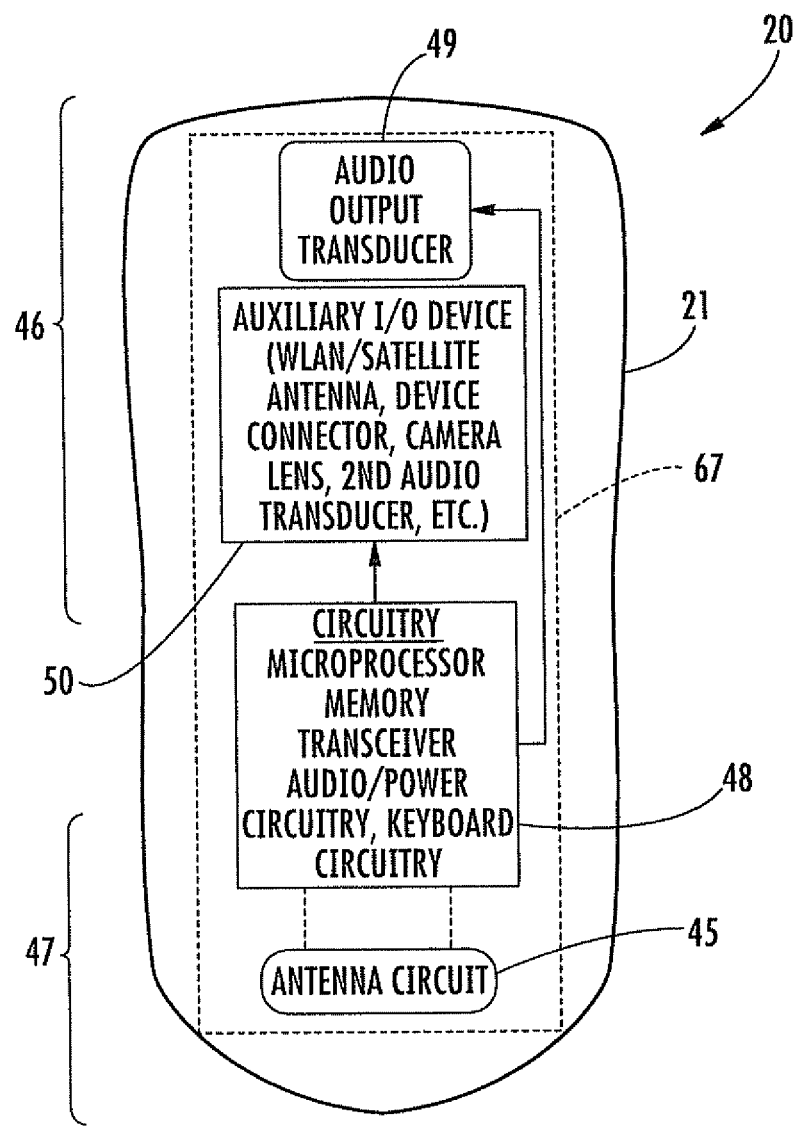
FIG. 1 is a schematic block diagram of an example of a mobile wireless communications device configured as a handheld device and illustrating basic internal components thereof as a non-limiting example.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout.

In accordance with a non-limiting aspect, a mobile wireless communications device includes a housing and at least one circuit board carried by the housing. Radio frequency (RF) circuitry is carried by the at least one circuit board and includes a transmitter and receiver. A processor is carried by the at least one circuit board and operative with the RE circuitry. An antenna is mounted within the housing and operative with the RF circuitry. A charging circuit is mounted within the housing and charges a battery carried by and powers the mobile wireless communications device. It includes at least one charging contact carried by the housing and configured for engaging an external charging cradle when connected thereto. It includes an internal connector extending to at least one circuit board and connecting the charging circuitry. An RF filter is connected to the charging contact and includes a ferrite material surrounding at least a portion of the internal connector to minimize RF coupling from the at least one charging contact to the antenna and reduce transmitter harmonics emission and receiver de-sense.

The housing can include a lower end to which the antenna and at least one charging contact are positioned in close proximity to each other. The housing case can have a lower edge mounting the antenna. The antenna can extend over the lower edge and the at least one charging contact is supported adjacent the lower edge to which the antenna is mounted. The antenna could be formed as a substantially n-shaped antenna extending over the lower edge.

In another aspect, the charging contact can be formed as a spring connector that extends to the at least one circuit board and is not surrounded by the ferrite material forming the RE filter. The at least one charging contact could be formed as two spaced charging contacts with opposite polarity. A respective RF filter can be connected to each respective charging contact. The RF filter in one aspect can be substantially cylindrically configured and surround and engage the internal connector. The housing can include an internal surface and an RF filter support extending from the internal surface to which the ferrite material is secured. The REF filter support could be formed as a cylindrical wall that supports the ferrite material.

In yet another aspect, the RF circuitry can be formed as a transceiver chip whether a single or multiple chip set. A battery charging pad can be carried by the at least one circuit board and connected to charging circuitry and the internal connector. The RF circuitry can be operative for generating global systems for mobile (GSM) packet bursts.

In another aspect, the housing case is substantially rectangular configured and has a rear surface, longitudinal side edges and a lower end forming a lower edge. A battery opening is contained in the rear surface to which a battery for powering the device is received.

Figure 2:
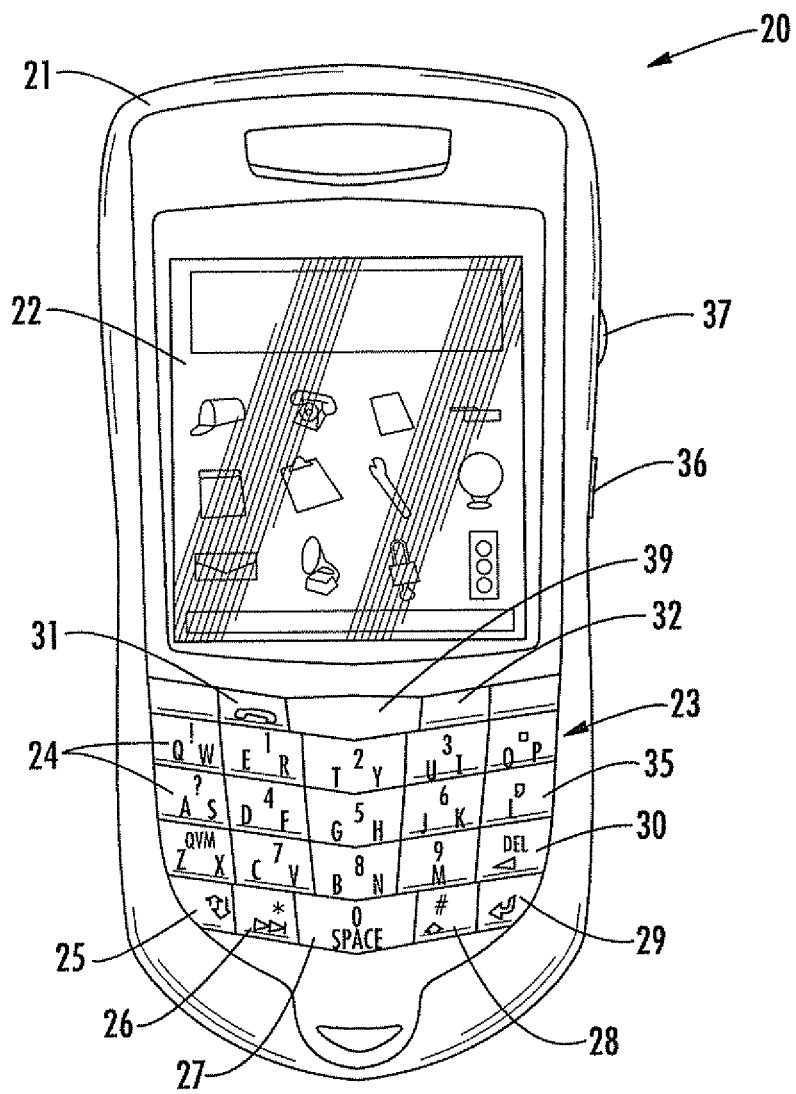
FIG. 2 is a front elevation view of the mobile wireless communications device of FIG. 1.
Figure 3:
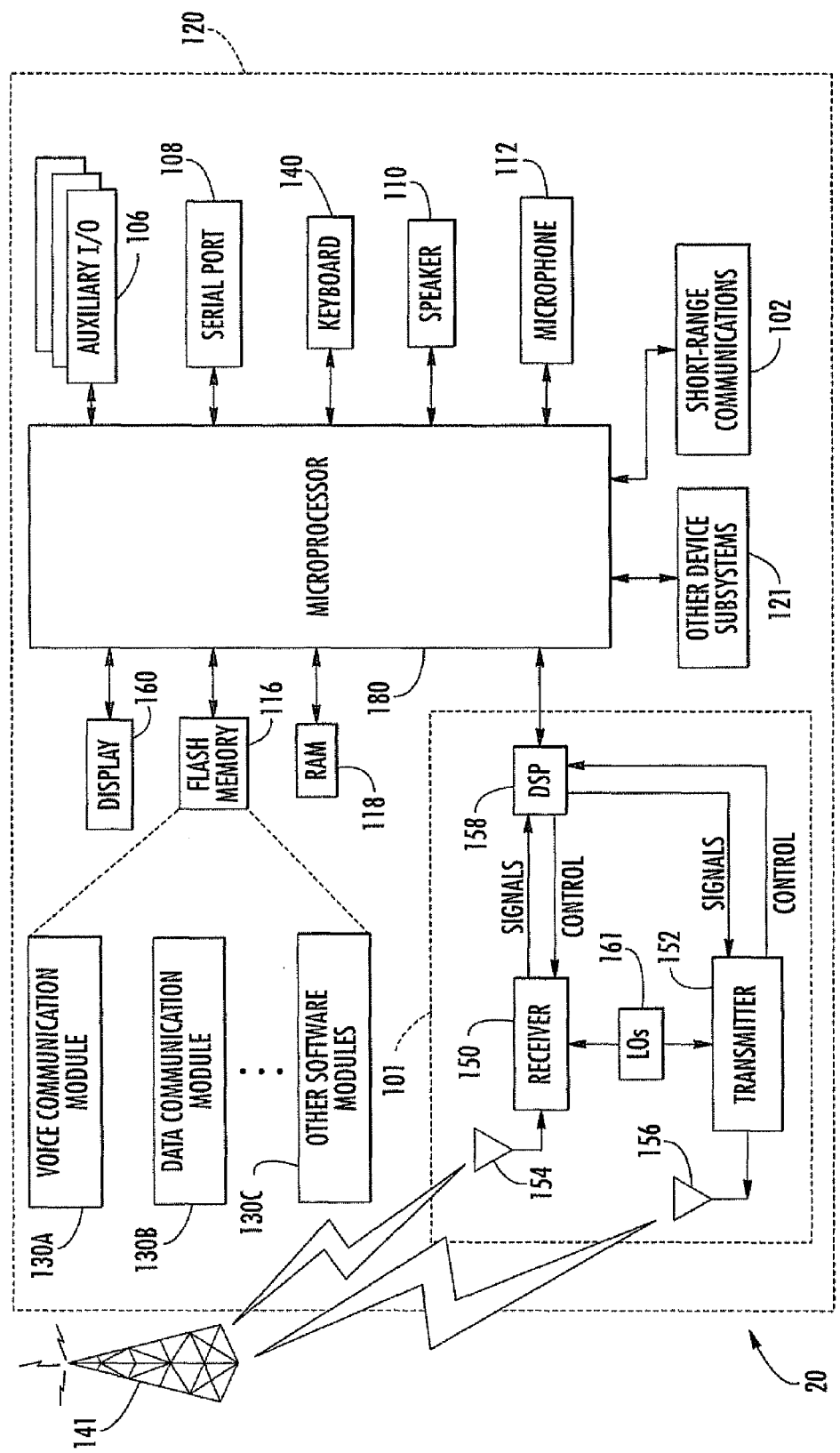
FIG. 3 is a schematic block diagram showing basic functional circuit components that can be used in the mobile wireless communications device of FIGS. 1-2.

A brief description will now proceed relative to FIGS. 1-3, which discloses an example of a mobile wireless communications device, for example, a handheld portable cellular radio, which can incorporate non-limiting examples of the various circuits, including the improved battery charging contact circuit. In-phase and Quadrature Modulation and Power Amplification circuit, and antenna contact as later described. FIGS. 1-3 are representative non-limiting examples of the many different types of functional circuit components and their interconnection, and operative for use in the circuits of the mobile wireless communications device that can incorporate the improvements, advantages and features as described.

Referring initially to FIGS. 1 and 2, an example of a mobile wireless communications device 20, such as a handheld portable cellular radio with improvements and advantages as described below is set forth. This device 20 illustratively includes a housing 21 having an upper portion 46 and a lower portion 47, and at least one dielectric substrate (i.e., circuit board) 67, such as a conventional printed circuit board (PCB) substrate, for example, carried by the housing. A number of different circuit boards can be used for supporting different components. For example, one circuit board could support the microprocessor and RF components, another circuit board could be formed as an antenna circuit board, and yet another circuit board could be formed as a circuit board for supporting different components such as a keyboard.

A housing (not shown in detail) would typically cover and enclose various components, such as circuit boards and an antenna. The housing includes a housing case, for example, a plastic case. The housing case could support a separate housing cover for front and rear sides depending on the type of design. Any type of housing or housing case will allow access to any circuit board and supports the one or more circuit boards. A battery opening provides access for a battery to power the device. The housing case could support an antenna in one non-limiting example, such as at its lower edge. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, but it should be understood that a flip or sliding housing can be used as is typical in many cellular and similar telephones. These and other housing configurations with different housing case designs may be used.

Circuitry 48 is carried by the circuit board 67, such as a microprocessor, memory, one or more wireless transceivers (e.g., cellular, WLAN, etc.), which includes RF circuitry, including audio and power circuitry, and in this aspect, including any keyboard circuitry. This circuitry could also generally be termed RF circuitry. It should be understood that, as noted before, keyboard circuitry could be on a separate keyboard, etc., as will be appreciated by those skilled in the art. The different components as described can also be distributed on one circuit board or among a plurality of different circuit boards as noted before. A battery (not shown) is also preferably carried by the housing 21 for supplying power to the circuitry 48. The term RF circuitry could encompass the interoperable RF transceiver circuitry, including receive and transmit circuits and power circuitry, including charging circuitry and audio circuitry, including In-phase and Quadrature circuits that include respective power amplifier circuits for respective In-phase and Quadrature circuits.

In one aspect, an audio output transducer 49 (e.g., a speaker) is carried by an upper portion 46 of the housing 21 and connected to the circuitry 48. One or more user input interface devices, such as a keypad (keyboard) 23 (FIG. 2), is also preferably carried by the housing 21 and connected to the RF circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

An antenna and associated antenna circuit 45 (FIG. 1) is preferably supported within the housing and in one aspect at a lower portion 47 in the housing, such as on the housing case lower edge. The antenna can be formed as a pattern of conductive traces that make an antenna circuit, which physically forms the antenna. It is operatively connected to the circuitry 48 on the main circuit board 67 or other circuitry on other boards. In one non-limiting example, the antenna could be formed on a separate antenna circuit board or an antenna circuit board section that extends from the main circuit board at the lower portion of the housing. By placing the antenna 45 adjacent the lower portion 47 of the housing 21, the distance is advantageously increased between the antenna and the user's head when the phone is in use to aid in complying with applicable SAR requirements. Also, a separate keyboard circuit board could be used as noted before.

More particularly, a user will typically hold the upper portion of the housing 21 very close to their head so that the audio output transducer 49 is directly next to the ear. Yet, the lower portion 47 of the housing 21 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances.

In some designs, the antenna 45 is placed adjacent the lower portion 47 of the housing 21 to allow for less impact on antenna performance due to blockage by a user's hand. Users typically hold cellular phones towards the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Another benefit of this type of configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/o devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22, for example, a liquid crystal display (LCD) carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. The letters on the keypad 23 are presented in a three-row format, with the letters of each row being in the same order and relative position as in a standard QWERTY keypad.

Each row of keys (including the fourth row of function keys 25-29) is arranged in five columns in this non-limiting example. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

In one non-limiting aspect, the antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, in one non-limiting example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well. In one non-limiting example, it is L-configured and positioned at the lower portion or edge of the support case.

The mobile wireless communications device shown in FIGS. 1 and 2 can incorporate email and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 20 of FIGS. 1 and 2 is further described in the example below with reference to FIG. 3. The device 20 illustratively includes a housing 120 shown in outline by the dashed lines, a keypad 140, and an output device 160. The output device 160 shown is preferably a display, which is preferably a full graphic LCD. Other types of output devices may alternatively be used. A processing device 180 such as a microprocessor is contained within the housing 120 and is coupled between the keypad 140 and the display 160. The processing device 180 controls the operation of the display 160, as well as the overall operation of the mobile device 20, in response to actuation of keys on the keypad 140 by the user.

The housing 120 may be elongated vertically, or may take on other sizes and shapes (including clamshell housing structures). The keypad may include a mode selection key, or other hardware or software for switching between text entry and telephony entry.

In addition to the processing device 180, other parts of the mobile device 20 are shown schematically in FIG. 3. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 20 is preferably a two-way RP communications device having voice and data communications capabilities. In addition, the mobile device 20 preferably has the capability to communicate with other computer systems via the Internet.

Operating system software executed by the processing device 180 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130A-130N on the device 20. A predetermined set of applications that control basic device operations, such as data and voice communications 130A and 130B, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 141. Preferably, the PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161. The specific design and implementation of the communications subsystem 101 is dependent upon the communications network in which the mobile device 20 is intended to operate. For example, the mobile device 20 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 20.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 20. In addition, the display 160 may also be utilized in voice communications mode, for example to display the identity of a calling party, the duration of a voice call, or other voice call related information.

Any short-range communications subsystem enables communication between the mobile device 20 and other proximate systems or devices, which need not necessarily be similar devices. For example, the short-range communications subsystem may include an infrared device and associated circuits and components, or a Bluetooth™ communications module to provide for communication with similarly-enabled systems and devices.

Figure 4:
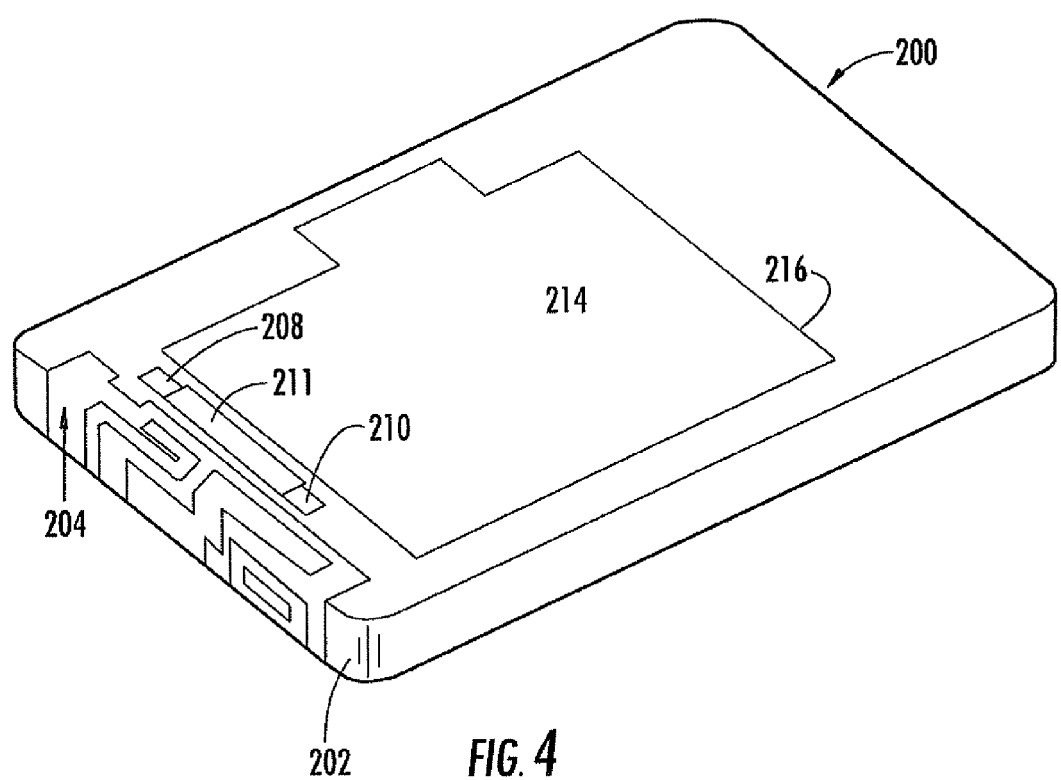
FIG. 4 is a fragmentary and isometric view of the rear or back section of a housing case as part of a housing for the mobile wireless communications device such as shown in FIGS. 1-3 and showing an example of the relative position of the antenna and battery charging contacts in a non-limiting example.

FIG. 4 shows a section of the mobile wireless communications device such as shown in FIGS. 1-3 and showing the relative position of the antenna and battery charging contacts on a portion of the back or rear section of the housing case 200 as part of the housing forming the mobile wireless communications device. A rear cover in some non-limiting examples could be inserted over the illustrated housing case. It is shown removed in this non-limiting example. In other aspects, the housing case could include integrated or separate front and rear housing covers depending on specific design options.

As illustrated in this one particular configuration, the housing case 200 is substantially rectangular configured and includes opposing ends and longitudinal edges and includes an end formed as a lower edge 202 corresponding, for example, to the lower portion 47 of the mobile wireless communications device of FIG. 1. The antenna 204 in this example is supported at the lower edge 202 of the housing case 200 and configured as an L-shaped antenna in cross-section and extends over the lower edge 202 of the housing case as illustrated. In this example, the antenna 204 extends substantially along the entire lower edge 202 except at the longitudinal edges.

Two battery charging contacts 208, 210 are positioned on the housing case 200 and operable to engage charging contacts (not shown) such as part of a charging cradle. The charging contacts 208, 210 are separated by an insulator strip 211 in this example. The battery charging contacts 208, 210 are placed in close proximity to the antenna 204 as illustrated in FIG. 4. On the housing case 200, the central section is defined by a battery well 214 to which a battery for powering the device could be received, and shown by the rectangular line 216 and could also define an area in the housing case 200 for access to various components, including any PCB boards as described relative to FIGS. 1-3.

Charging contacts are a feature of many mobile wireless communications devices such as shown and described relative to FIGS. 1-3. As shown by the close proximity between the battery charging contacts 208, 210 and the antenna 204 in FIG. 4, radio frequency (RF) coupling occurs at the charging contacts and can affect the antenna performance and cause transmitter circuitry harmonics emissions and receiver circuitry de-sense. The charging contacts 208, 210 are typically also positioned close to a power amplifier circuit such as described relative to FIGS. 1-3, which also causes various RF and other interference issues with the internal circuitry and antenna.

Figure 5:
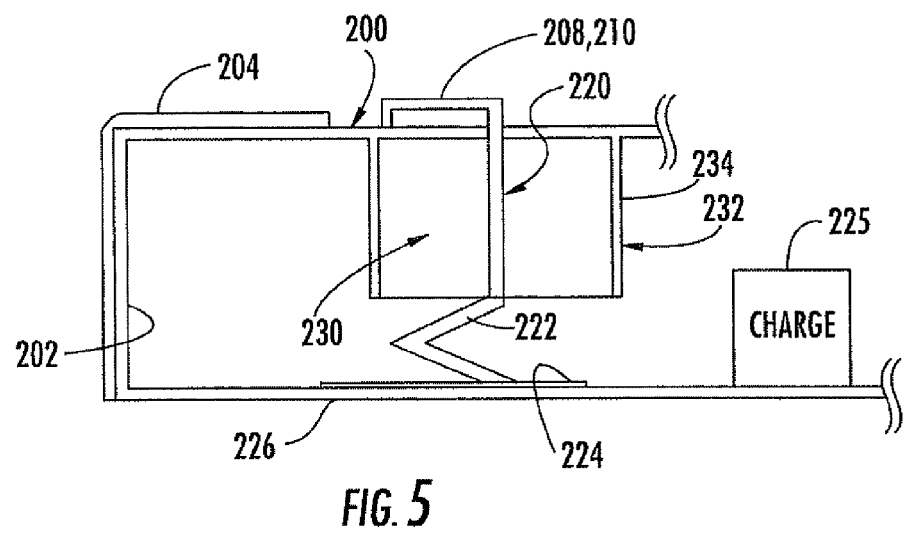
FIG. 5 is a fragmentary, side elevation view of a battery charging contact and its spring connector and antenna on the housing case and showing a filter positioned near the charging contacts to minimize transmission harmonics emission and receiver de-sense.

As shown in FIG. 5, each of the charging contacts 208, 210 includes an internal connector as an electrical conductor indicated generally at 220 that extends downward and includes a lower internal spring (e.g., biased) connector 222 that connects to a battery charging pad 224 positioned on the printed circuit board 226. Thus, each internal connector 220 with its associated spring connector 222 segment forms a biased electrical connector between the exposed surface of the contact such as shown by the reference numerals 208 and 210 in FIG. 4 and battery charging pads on the circuit board. In this side elevation view, only one charging contact and associated battery charging pad is illustrated. The battery charging pad 224 connects to battery charging circuitry 225 such as by signal traces on the circuit board. The charging circuitry 225 could be separate from the circuit board in some examples and connected by lead wires to battery charging pad 224. It should be understood that in this example, FIG. 5 shows only one charging contact in this elevation view, but each charging contact could have an internal connector 220 and its associated lower section formed as a spring connector 222 connected to a respective battery charging pad 224.

The battery charging contacts 208, 210, and any associated battery charging pad 224 and the internal connector 220 and its associated spring connector 222 can operate similar to an antenna, creating some interference issues. The charging contacts 208, 210, their internal connector 220 and associated spring connector 222 and the battery charging pad 224 connect to the charging circuit 225, which typically has a low impedance for RF it is typically close to the antenna, and heavily couples energy to the antenna 204 and loads the antenna impedance. A respective charging contact could have a respective polarity as understood by those skilled in the art.

Any type of spring connector such as the illustrated internal connector 220 with its associated spring connector 222 can resonate at the band of interest and cause interference. The battery charging contacts 208, 210 with their internal connectors and charging pads can pick up digital noise from the digital circuits as part of a mobile wireless communications device where energy is supplied from the battery and coupled back with any power amplifier harmonics to the battery and battery charging circuit. This creates even greater digital noise and desensitizes any radio frequency circuitry associated with the receiver. Also, during any transmission, a power amplifier can eject harmonics and these harmonics can be coupled to the charging contacts 208, 210.

Some proposals to reduce interference have used ferrite beads positioned on printed circuit boards, for example, on the signal traces formed on circuit boards, to reduce the harmonics and interference. Ferrite beads on a circuit board help reduce noise coupled beyond the ferrite beads, for example, close to any internal connectors including spring connectors, charging contacts or battery charging pads. The ferrite beads, however, are positioned on the circuit board and not at the internal connectors and associated spring connectors and charging contacts for the charging circuit. Thus, the RF impedance is still increased at that point in some designs.

As shown in FIG. 5, an RF filter 230 as a core of ferrite material is placed at each of the respective charging contacts 208, 210 at a portion of the internal connector 220 above the associated spring connector 222 in this non-limiting example and will prevent RF coupling to the antenna 202 and the associated battery charging contact and its internal connector and associated spring connector 222 and any associated battery charging pads. This ferrite material will also prevent high impedance and prevent noise from being ejected that will de-sense the receiver circuit or radiate harmonics during the transmit mode.

The L-shaped antenna 204 as shown in FIG. 4 in this example is wrapped around the lower edge 202 of the support case 200 (FIG. 5). The PCB board 226 as illustrated includes the various RF components as described relative to FIGS. 1-3, including connection lines and other components. These components are not shown in detail in FIG. 5. The battery charging contacts 208, 210 are shown closely positioned near the antenna 204 and supported by the housing case 200 and, as explained before, include the downward extending internal connector 220 and its associated lower section formed as a spring connector 222 and such that battery charging contacts 208, 210 electrically engage a battery charging pad 224 on the printed circuit board 226 as part of the battery charging circuit. As illustrated, the battery charging pad 224 connects to part of charging circuit 225, which is positioned on the circuit board in this non-limiting example, but as noted before, could be supported elsewhere in the housing.

As illustrated, an internal section of the housing corresponding to the housing case 200 includes a downward extending RF filter support 232 for the ferrite material as an RF filter 230, e.g., a "holster," as a non-limiting example in this instance, which could be formed as a cylindrical wall 234 that extends around a substantial portion of the internal connector to hold the ferrite material (formed cylindrically in this example to fit within the filter support) in place relative to the battery charging contacts and their internal connector 220 up to the lower spring connector 222. The RF filter 230 formed from the ferrite material does not interfere with the biasing action of the internal connector in this non-limiting example since the spring connector is not covered. Other configurations besides a cylinder could be used to form the RF filter support 232 as part of the housing case. The ferrite material 230 is received in this RE filter support and secured thereby and acts similar to a ferrite bead relative to the internal connector 220 and its associated spring connector 222 as part of the battery charging contact 208 and prevents RE coupling. The ferrite material as an RE filter 230 acts similar to a ferrite bead, such as placed directly on the circuit board, but instead is a ferrite material that encompasses a portion of the internal connector 220. It could also encompass part of the associated spring connector 222 as long as it did not interfere with any biasing function of the spring connector.

In this non-limiting example, the spring connector 222 as part of the internal connector 220 is used to add resilience to the overall connector. The mobile wireless communications device during charging is typically placed in a charging cradle (in this example), and resilience in movement helps ensure contact for charging. The ferrite based RF filter 230 is incorporated with the charging contacts 208, 210 and provides the high RF impedance across the frequency bands of interest such that the charging contacts will present high impedance to the antenna. Therefore, the antenna performance will not be degraded.

This RF filter 230 is formed in this non-limiting example from a ferrite material that blocks the transmission (Tx) harmonics coupled from any RF power amplifier to any traces or connection lines formed on the printed circuit board such as from the battery charging pad and prevent any energy from radiating by the charging contacts. In a radio frequency (RF) receive mode, most of the digital noise coupled from the processor or other CPU and other high frequency digital circuits to the charging contacts 208, 210 will be eliminated by the ferrite RF filter 230, which prevents receiver de-sensing due to the noise picked-up by the antenna 204. By implementing this RF filter 230 near the charging contacts 208, 210 as shown in FIG. 5, these technical problems are minimized as compared to a more conventional technique of placing ferrite beads on a printed circuit board. Thus, the charging contacts 208, 210 are designed such as in the non-limiting example shown in FIG. 5 to incorporate the RF filter 230.

Figure 6:
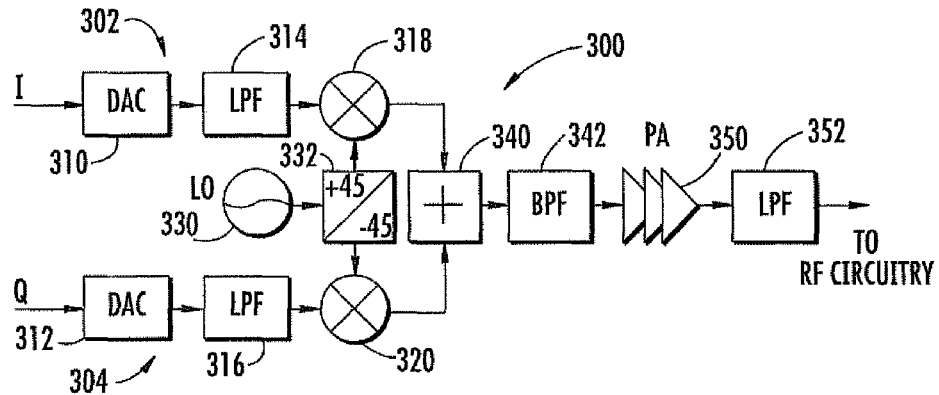
FIG. 6 is a block diagram of a conventional In-phase and Quadrature (I/Q) modulation and power amplification circuit showing one power amplification circuit after combining I/Q signals.

Referring now to FIG. 6, there is illustrated a block diagram of a conventional In-phase and Quadrature (I/Q) modulation and power amplification circuit illustrated generally at 300 that is typically used in many different types of communications devices, especially lower power mobile wireless communications devices. The circuit 300 has one power amplifier circuit after the In-phase and Quadrature modulation and mixing and power combining.

FIG. 6 shows this conventional I/Q modulation and power amplification circuit 300. It has In-phase and Quadrature inputs (I) and (Q) for a respective In-phase circuit 302 and Quadrature circuit 304 that each include a respective digital-to-analog converter (DAC) 310, 312, low pass filter 314, 316 and mixer 318, 320 as illustrated. A local oscillator 330 generates a local oscillator (LO) signal into a frequency divider 332, which passes the resulting and divided signals into the respective mixers 318, 320 as illustrated. The frequency divider 332 provides for +45 and −45 phase/frequency adjustment for I and Q modulation.

The output from the mixers 318, 320 are combined (or summed) at a power combiner 340 into one signal that is then bandpass filtered within a respective bandpass filter 342. One or more RF power amplifiers form a power amplifier circuit 350 amplifies the signal after bandpass filtering. The amplified signal is then filtered in a low pass filter 352. The filtered signal is passed to further RF circuits for other processing, including an antenna as part of any transmitter circuitry for signal transmission over-the-air. The modulation and power amplification circuit 300 shown in FIG. 6 may have linearity issues with the power amplifier (PA) circuit 350 and requires a more flexible IQ modulation scheme. This can be especially relevant when the power amplifier circuit design is used for 8 PSK (phase shift keying), quadrature amplitude modulation (QAM) and similar modulation schemes, typical in some lower power communications devices.

This conventional circuit 300 also may have a poor antenna match degrading total radiated power (TRP) and cause less efficiency because of the current power amplifier drawbacks, making it difficult to make improvements in radio frequency transmitter performance and battery life. Also, this type of conventional circuit 300 may have harmonics issues because of the higher non-linearity of the power amplifier. Some very high power I/Q modulation circuits such as in large and powerful base stations may use multiple power amplifiers that are power combined into an antenna, but they typically incorporate complex circuit features such as feed forward, feedback, free-distortion, complex mixing and complex power amplifier circuits. Those types of solutions are not always adequate for lower power mobile wireless communications device. Some communications circuits for I/Q modulation incorporate parallel output stages. These are usually targeted to achieve better linearity in any power amplifier circuit. The parallel output stages are sometimes used for heat control, increased power output, signal quality, peak power improvement and similar aspects. These circuits still may suffer drawbacks and may not be as reliable or adapted for lower power application as indicated above.

Figure 7:
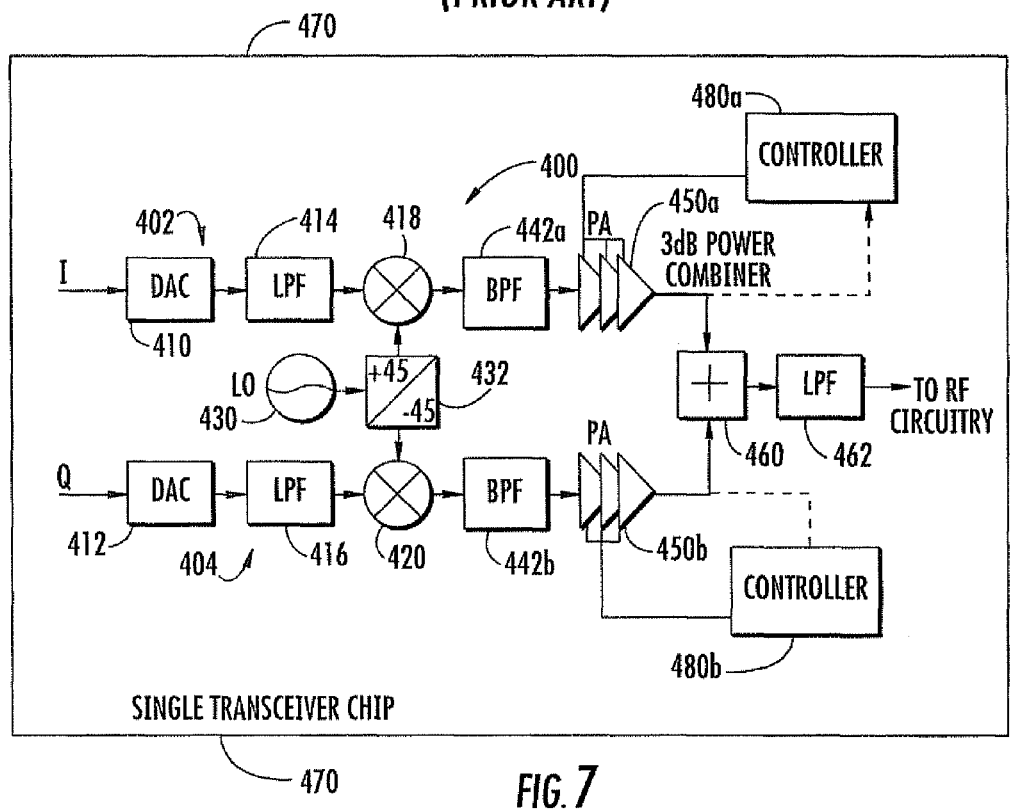
FIG. 7 is a block diagram of an In-phase and Quadrature modulation and power amplification circuit that includes a separate power amplifier circuit for each of the In-phase and Quadrature circuits in accordance with a non-limiting example.

FIG. 7 is a block diagram of an IQ modulation and power amplification circuit 400 in accordance with a non-limiting aspect that includes I/Q signal inputs and an In-phase circuit 402 and Quadrature circuit 404, including the basic components in each I/Q circuit 402, 404 of a respective DAC 410, 412, LPF 414, 416 and mixer 418, 420. The components are similar to components shown in FIG. 6, but with modifications that could be made as a result of the changes in each I/Q circuit 402, 404 to include a power amplifier circuit as described below.

Each I/Q circuit 402, 404 includes a power amplifier circuit 450a, 450b that is used only for amplifying respective I or Q signals in the respective I/Q circuits 402, 404. The respective power amplifier circuit 450a, 450b is positioned into each of the respective In-phase and Quadrature circuits 402, 404. The local oscillator 430 and frequency divider circuits 432 can be similar as with the circuit of FIG. 6 with modifications as are necessary. After mixing within respective mixers 418, 420, the respective I and Q signals are each bandpass filtered within the respective bandpass filters 442a, 442b, and then each power amplified by respective power amplifier circuits 450a, 450b such that the separate In-phase and Quadrature signals are power amplified separately and not after being combined as in the circuit of FIG. 6. Afterward, the respective I and Q signals are power combined within a power combiner 460 and the resultant signal filtered within a low pass filter 462.

This I/Q modulation and power amplification circuit 400 in this non-limiting example uses two separate power amplifier circuits 450*a*, 450*b* with 3 dB less output power as compared to a more conventional single power amplifier circuit positioned after combining such as shown in FIG. 6, resulting in better linearity of the power amplifier circuit and increased DC power efficiency, while still maintaining the same output power through a 3 dB power combiner 460 as a non-limiting example. The power combiner 460 isolates the output from the input such that the circuit 400 can prevent a poor antenna match from directly affecting the power amplifier and radio frequency (RF) performance. With higher and more efficient power amplifier circuits 450*a*, 450*b* as described for each I/Q circuit 402, 404, it is possible to gain longer battery life. Because it is possible to use more linear power amplifiers with the design as shown in FIG. 7, there is less harmonic emission from the power amplifier output.

Not only is IQ modulation achieved with the circuit design shown in FIG. 7, but also digital amplitude, frequency and phase modulation is achieved in an efficient manner. The better linearity and power-added efficiency occurs because of using smaller power amplifier circuits such as associated with a mobile wireless communications device to achieve a desired output power, for example, greater than 33 dBm. This I/Q modulation and power amplification circuit 400 allows a more flexible digital modulation for different modulation schemes with similar hardware architectures. It is possible to implement the circuit 400 on a single transceiver chip such as shown by the line at 470 due to the use of the respective power amplifier circuits 450*a*, 450*b*, transmitting 3 dB less of RF power than a normal single power amplifier circuit 350 such as shown in FIG. 6. The IQ modulation and power amplification circuit 400 shown in FIG. 7 includes as a non-limiting example a 3 dB power combiner 460 such as a quadrature hybrid power combiner and provides an easier power amplifier match for better output power, efficiency and immunity to mobile antenna impedance change. The power combiner 460 also allows the cancellation of even order transmit harmonics, which in turn, will make any harmonics filter design easier with less insertion loss and associated factors.

A quadrature hybrid power combiner 460 as a non-limiting example can be formed using different techniques and typically combines two, usually equal amplitude, quadrature-phased input signals into a single output signal. The combiner could use lumped element circuits, strip line circuits, or other circuits. The strip line circuits can be used in those applications requiring low loss or high power or both. Typically, a fundamental circuit element is a 3 dB quarter-wave coupler and formed as a four port network. The signal applied to a first port could be split equally between a second and third port with one of the outputs having a relative 90-degree phase shift. When the second and third ports are terminated into matching impedances, the signal applied to the first port is typically transmitted to a load connected to the second and third ports such that a fourth port receives negligible power and is "isolated." An impedance mismatch at the second port could reflect some signal power back from the second port to be divided proportionally between the first and fourth ports. It is also possible to vary the relative input/output phasing even though the relationship between the output ports is maintained at 90 degrees. It may be possible to form a lumped element construction with one or more toroidal cores. Typically in a lumped element design, the insertion loss is related to the Q values of different components used in the network.

In a strip line component, however, the insertion loss can result from the resistance of conductors and a mismatch loss at input/output ports and directivity loss. Thicker conductors could reduce some of that loss.

The I/Q modulation and power amplification circuit 400 shown in FIG. 7 overcomes the technical drawbacks and problems associated with the type of circuit 300 shown in FIG. 6 in which only one power amplifier circuit 350 is used after power combining, especially with power amplifier designs for GSM/GPRS/EDGE systems to achieve both GMSK and 8 PSK. Different RF transceiver systems have different transceiver architectures for digital frequency and phase modulations with IQ modulation.

The I/Q modulation and power amplification circuit 400 of FIG. 7 with respective power amplifier circuits 450*a*, 450*b* in each of I and Q circuits 402, 404 allows greater control over any power amplifier driver and/or power amplifier biasing, even when using either open loop systems or larger or smaller closed loop systems. Controllers 480*a*, 480*b* (or one controller) are operative with the respective power amplifier circuit 450*a*, 450*b* and controls gain and other factors. The controllers 480*a*, 480*b* can be open loop or closed loop control (as shown by the dashed feedback line in each circuit). The I/Q modulation and power amplification circuit 400 shown in FIG. 7 unifies the IQ modulation scheme with linear/higher efficiency/higher power requirements of power amplifier designs such that different types of digital modulations, for example, AM, FM and PM can be fulfilled. Also, the two respective power amplifier circuits 450*a*, 450*b* shown in FIG. 7 can be calibrated to achieve high linear/efficiency/power amplifier design with low harmonics and less sensitivity to antenna loading.

In one non-limiting aspect, the power combiner 460 is operative as a 3 dB quadrature hybrid combiner as noted before. With this circuit design as described, two power amplifier circuits 450*a*, 450*b* could be used with only 30 dBm (1 watt) output power to achieve 33 dBm. The loss due to the power combiner 460 could be about 0.2 to about 0.3 dB, which could handled using a sharp low pass filter 462 to force down the third harmonics of the power amplifier. Thus, it is possible that the power amplifier circuits 450*a*, 450*b* with 30 dBm output can be established to achieve 33 dBm output. Typically, using the 3 dB quadrature hybrid power combiner 460, it is possible to isolate the antenna matching from the power amplifier matching to obtain better transmission radiated power (TRP). As a result, the antenna design does not require more than one feed port to incorporate the power combiner as described.

It should be understood that the quadrature hybrid power combiner 460 can be tolerable to the mismatch of an antenna load impedance. Also, the quadrature hybrid gives greater reflectivity for phase and frequency modulation. Thus, efficient amplitude modulation can occur by changing the bias of the power amplifier circuits 450*a*, 450*b* for each of the In-phase and Quadrature circuits 402, 404 and give greater flexibility in circuit function.

FIG. 7A illustrates a graph showing an example of the cancellation of some even order harmonics using the circuit of FIG. 7.

Figure 8:
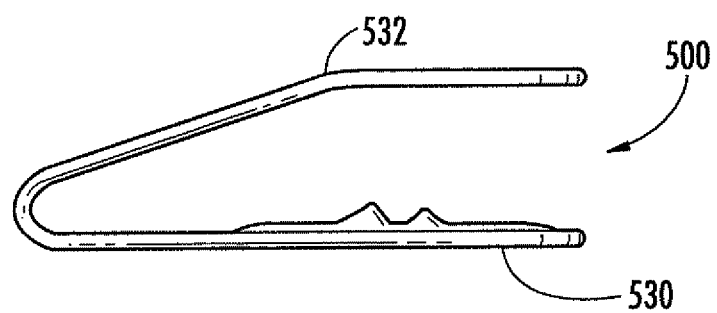
FIGS. 8 and 9 are side elevation views of prior art antenna contacts used with different mobile wireless communications devices.
Figure 9:
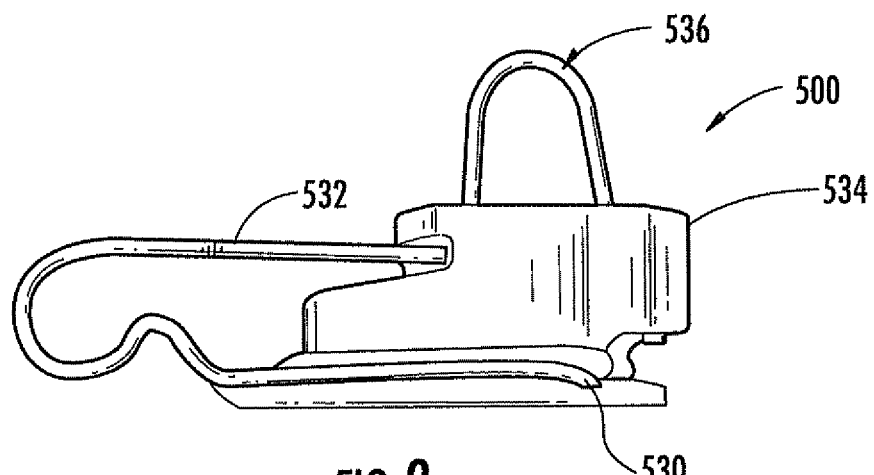
Figure 10:
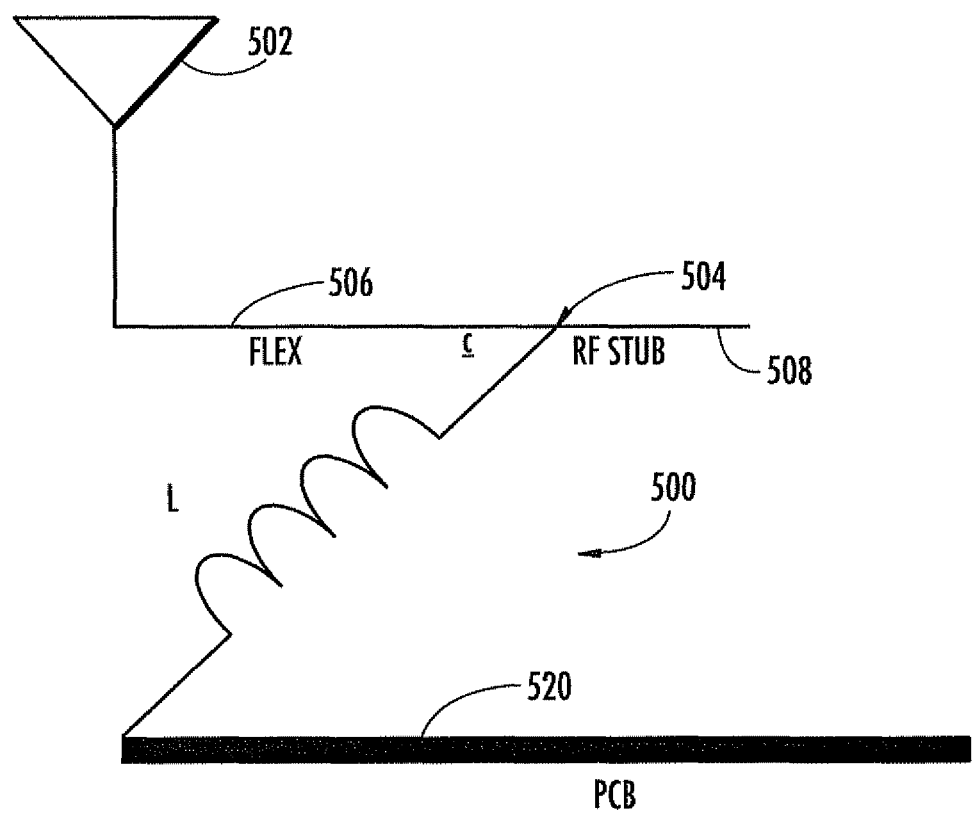
FIG. 10 is a schematic circuit diagram of the equivalent circuit for the prior art antenna contacts shown in FIGS. 8 and 9.

Some mobile wireless communications devices incorporate various antenna designs that include antenna contacts such as shown in FIGS. 8 and 9. These antenna contacts typically connect between an antenna carried inside the mobile wireless communications device such as shown in FIGS. 1-3 and a circuit board carrying RF circuitry, such as a transceiver. An equivalent schematic circuit diagram for the antenna contact 500 of FIGS. 8 and 9 and an associated antenna is shown in FIG. 10 in which the antenna 502 is illustrated. This antenna 502 includes a contact point (c) 504 connecting the antenna contact and at an antenna flex section 506 that extends from the contact point (c) 504 to the point where the antenna contact connects, and an extended flex section as an RF stub 508.

As illustrated, the antenna contact 500 is configured to act like a spring such as shown in the examples of FIGS. 9 and 10 (configured similar to an elongated clip or hairpin with upper and lower or top and bottom legs) and having an inductance L, based on its configuration and its contact to the RF stub and flex and to a contact on the printed circuit board 520. Both FIGS. 9 and 10 show how the antenna contact 500 forms a spring type mechanism in which the lower section or leg 530 forms a board contact that could be soldered or attached by other techniques to the printed circuit board 520, for example, an antenna board as in FIG. 10. The upper section or leg 532 of the antenna contact is a biased spring section forming an upper leg engages an antenna at its contact point 504, including any necessary feed lines or other contact points or connections.

FIG. 9 shows an additional contact section 534 that slides on the upper spring biased section or leg 532 to form a section that engages at the contact point the RF stub as explained before. This contact section 534 includes an upper contact member 536 shaped in an inverted U for making contact to the antenna near the RF stub at the contact point in one non-limiting example. The antenna contact 500 in FIG. 8 could have a similar additional upper contact member 534 slid thereon.

One drawback of such antenna contact designs as shown in FIGS. 8 and 9 and the equivalent schematic circuit of FIG. 10 is that these antenna contacts as circuits do not provide adequate RF performance because of the long physical length that creates a higher radio frequency (RF) inductance. The RF performance varies significantly because of the design variation in antenna contact design. Also, the spring effect of these types of antenna contacts often is lost after being depressed even one time. This type of antenna contact is not as strong as desirable and does not adequately secure to an antenna after the mobile wireless communications device has been dropped several times, thus, creating reliability issues such as caused from weak solder joints engaging the antenna contact, for example, to the circuit board.

Figure 11:
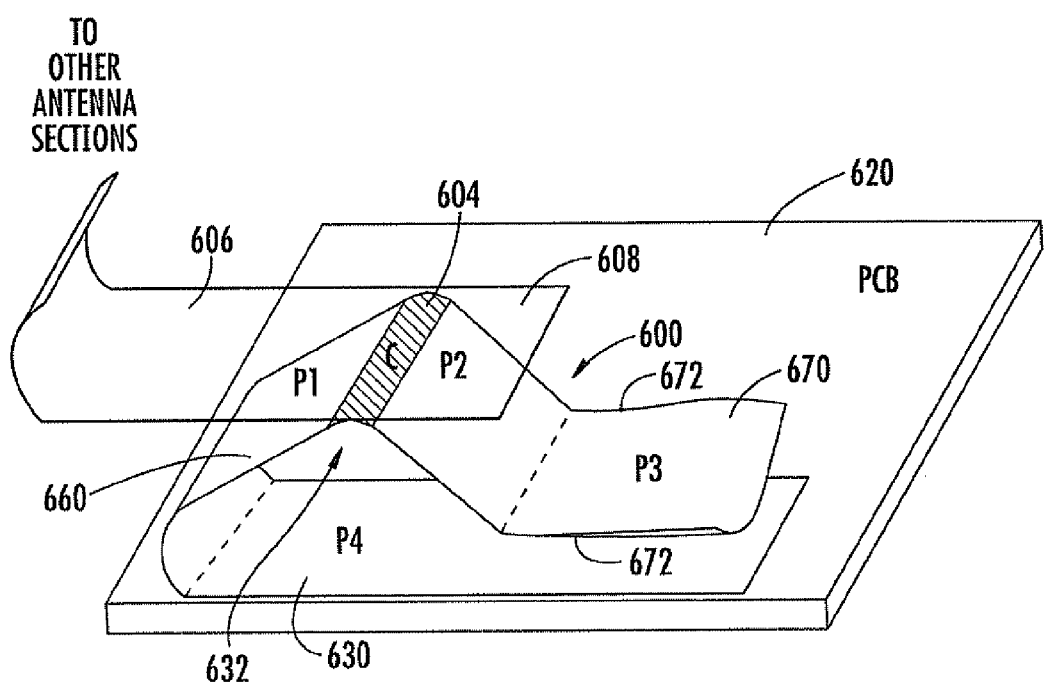
FIG. 11 is a fragmentary, isometric view of an antenna contact that, in accordance with a non-limiting example, ensures good radio frequency (RF) and mechanical performance.
Figure 12:
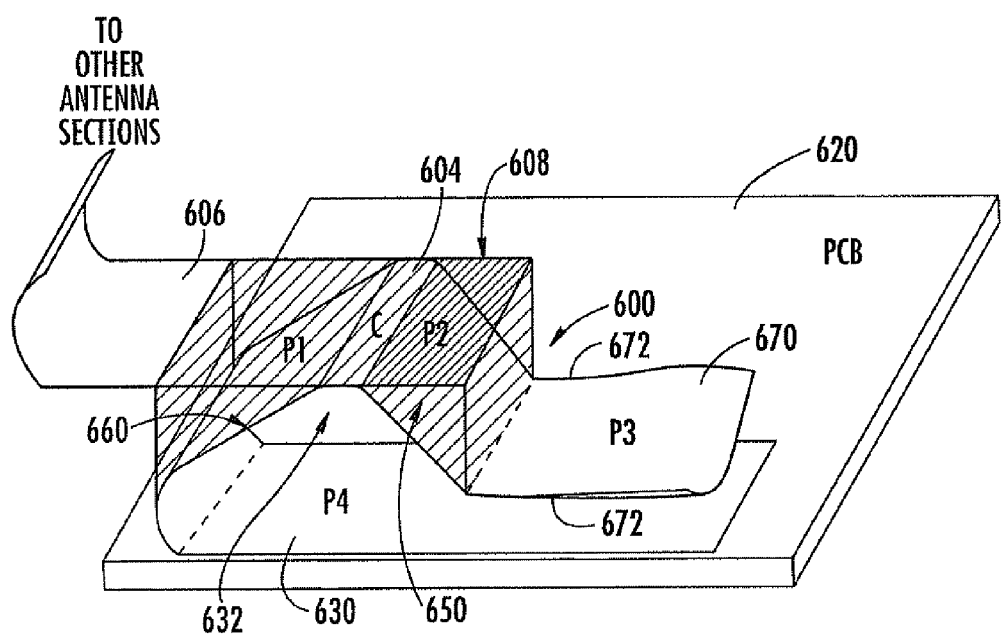
FIG. 12 is another fragmentary, isometric view of the antenna contact as shown in FIG. 11 and showing the added conductive Electromagnetic Interference (EMI) material to reduce inductance and variation resulting from an extended RF stub.
Figure 13:
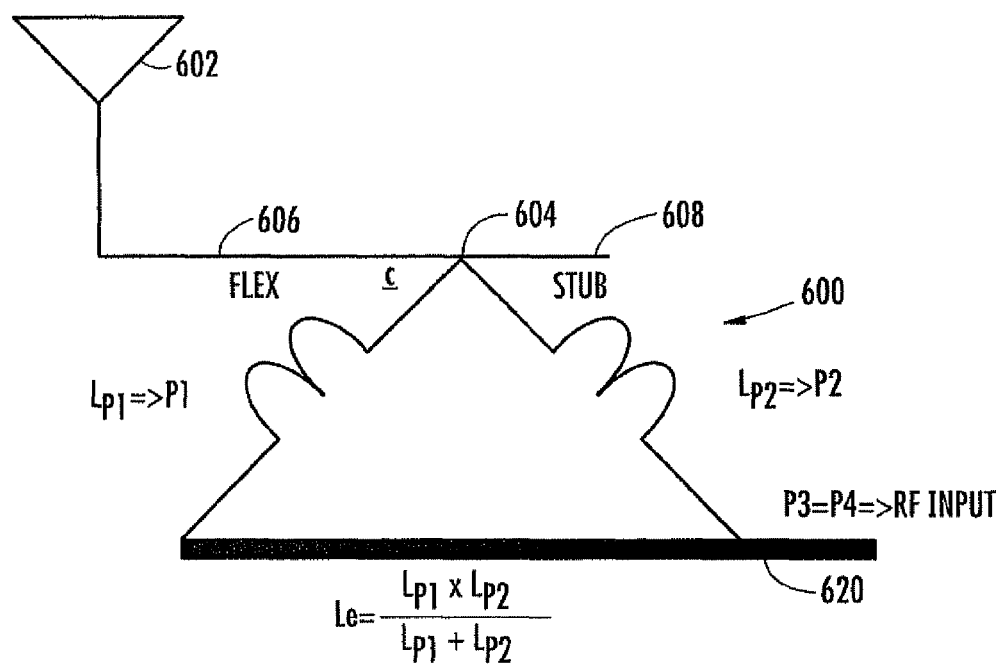
FIG. 13 is a schematic circuit diagram of an equivalent RF circuit of the antenna contacts in accordance with a non-limiting example shown in FIGS. 11 and 12 that ensures good radio frequency (RF) and mechanical performance.

FIGS. 11-14 show an antenna contact 600 in accordance with a non-limiting aspect that offers better RF performance by significantly reducing any antenna contact length and providing parallel inductances as shown in the equivalent schematic circuit diagram of FIG. 13. This antenna contact 600 has similar functional components as in that shown in FIGS. 8-10 but with enhanced performance resulting from better design. As shown in the schematic circuit diagram of FIG. 13, basic components of the antenna contact 600 include the extended flex portion as the RF stub 608, the contact point 604, the antenna flex 606 and other portions forming the antenna 602 and operating through RF components on the circuit board 620 such as a transceiver circuit. The equivalent inductance Le in FIG. 13 is significantly reduced as compared with the single higher inductance of L shown in the antenna contact and associated antenna schematic circuit of FIG. 8.

Figure 14:
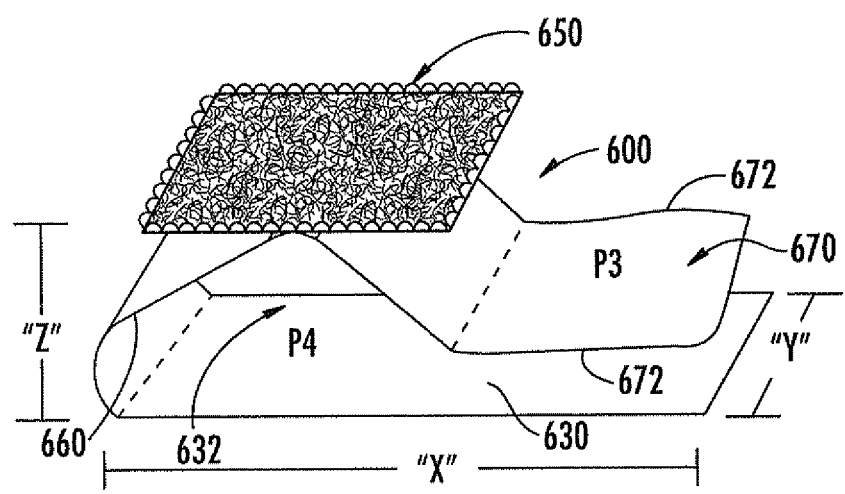
FIG. 14 is another fragmentary, isometric view of the antenna contact such as shown in FIG. 12 and showing a better view of the EMI material added near the contact point and also showing relative dimensions in a non-limiting example.

FIGS. 11, 12 and 14 are fragmentary and partial isometric views of the antenna contact 600 and showing the basic configuration in FIG. 12 with a portion of the antenna flex 606 and the contact point 604 and REF stub 608. Relative dimensions are shown in the equivalent schematic circuit of FIGS. 13 and 14 to give an idea of the resulting improvement in performance.

This configuration as shown in FIGS. 11-14 provides consistent physical contact with the antenna flex 606 and REF stub 608 (FIG. 11). To reduce the variation of the contact point C 604 and the extended antenna flex 606 and the RF stub 608, a core shield EMI material 650 as an RF filter is added on the antenna flex at the contact point and engages the REF stub 608 and provides secure contact and low RF inductance and variation. As illustrated, to strengthen the resulting biasing of the antenna contact configuration, the antenna contact 600 includes a lower leg 630 at the upper spring biased section or upper leg 632 is formed to have increased mechanical support resulting from an inverted V-shaped configuration forming P1 and P2 for that upper section or upper leg 632 along with a horizontally extending slide landing element 670 P3. To avoid potential solder wicking during a solder reflow process when the antenna contact 600 is soldered onto a circuit board such as a main circuit board or antenna board, the edges 672 for the slide landing element P3 670 are elevated from contact with P4 630 as the lower section that contacts the printed circuit board and forms a concave shape or U-shaped bend while still maintaining physical and electrical contact with the lower leg 630 P4. Thus, the antenna contact still has a configuration similar to a C-clip, but with greater efficiency of design. This improved antenna contact 600 as described and shown in FIGS. 11-13 provides strong and secure physical contact to improve the reliability of a drop test while offering good and consistent radio frequency (RF) performance.

The EMI material forming the filter 650 as shown in FIGS. 12 and 14 can be a conductive foam glued to the antenna flex as the RF stub 608, such as a Gore-Shield® EMI material as the GS8000 EMI shielding gasket, This type of material provides excellent conformability and excellent cavity-to-cavity EMI shielding and conductivity at low compressive forces.

This type of material can be supplied as a precision die-cut part on rolls and can be formed as a foil-backed, nickel-plated base polymer with an electrically conductive and pressure-sensitive adhesive. No curing is required.

| GS8000 Nominal Properties | | |
|---|---|---|
| Property | Nominal Value | Test Method |
| Composite thickness | 1.62 ± 0.25 mm | Measured |
| Die-cut thickness | 1.0 mm[1] | Optically |
| Liner | 0.51 mm Polyester | N/A |
| Recommended compression stop | 0.3 to 0.5 mm (0.4 mm ideal) | N/A |
| Pressure to compress to 0.4 mm | 3.5 kg/cm$^2$ (50 psi) | EM2WIIN T-1055[2,3] |
| DC resistance at 0.4 mm | 6 mΩ | EM2WIIN T-1055[2,3] |
| Volume resistivity at 0.4 mm | 0.03 Ω-cm | Modified ASTM-D2739 |
| Shielding effectiveness at 0.4 mm (0.1 to 3 GHz) | >80 dB | Modified ARP-1705[4] |

An example of relative dimensions for the antenna contact 600 is shown in FIG. 14. "X" could be about 4.2 mm. "Y" could be about 1.6 mm. "Z" could be about 1.5 mm.

This application is related to copending patent applications entitled, "MOBILE WIRELESS COMMUNICATIONS DEVICE WITH SEPARATE IN-PHASE AND QUADRATURE POWER AMPLIFICATION," and "MOBILE WIRELESS COMMUNICATIONS DEVICE WITH ANTENNA CONTACT HAVING REDUCED RF INDUCTANCE," which are filed on the same date and by the same assignee and inventors, the disclosures which are hereby incorporated by reference.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device, comprising:
a housing;
at least one circuit board carried by the housing and including radio frequency (RF) circuitry carried by the at least one circuit board and comprising a transmitter and receiver, and a processor carried by the at least one circuit board and operative with the RF circuitry;
an antenna mounted within the housing and operative with the RF circuitry;
a charging circuit mounted within the housing for charging a battery carried by and powering the mobile wireless communications device and comprising at least one charging contact carried by the housing and having an exposed surface on the housing and spaced from the at least one circuit board and configured to engage an external charging cradle when connected thereto, said charging contact further comprising an internal connector comprising a lower biased spring connector that extends downward to engage the at least one circuit board and connecting to the charging circuit and an upper unbiased connector section that extends upward from the biased spring connector; and
an RE filter connected to said charging contact and comprising a cylindrical ferrite material surrounding and engaging said upper unbiased connector section of the internal connector at a location adjacent to the charging contact to minimize RF coupling from the at least one charging contact to the antenna and reduce transmitter harmonics emission and receiver de-sense.

2. The mobile wireless communications device according to claim 1, wherein said housing comprises a lower end to which said antenna and at least one charging contact are positioned in close proximity to each other.

3. The mobile wireless communications device according to claim 2, wherein said housing further comprises a housing case having a lower edge mounting the antenna, wherein said antenna extends over said lower edge and said at least one charging contact is supported adjacent to the lower edge to which the antenna is mounted.

4. The mobile wireless communications device according to claim 3, wherein said antenna comprises an L-shaped antenna extending over the lower edge.

5. The mobile wireless communications device according to claim 1, wherein said at least one charging contact comprises a two spaced charging contacts with opposite polarity and a respective RF filter connected to each respective charging contact.

6. The mobile wireless communications device according to claim 1, wherein said housing comprises an internal surface and further comprising a RF filter support extending from the internal surface to which said ferrite material is secured.

7. The mobile wireless communications device according to claim 6, wherein said RF filter support comprises a cylindrical wall that supports said ferrite material.

8. The mobile wireless communications device according to claim 1, wherein said RF circuitry comprises a transceiver chip.

9. The mobile wireless communications device according to claim 1, and further comprising a battery charging pad carried by the at least one circuit board and connected to the charging circuit and the internal connector.

10. The mobile wireless communications device according to claim 1, wherein said RF circuitry is operative for generating Global Systems for Mobile (GSM) packet bursts.

11. A mobile wireless communications device, comprising:
a housing comprising a rectangular configured housing case having a rear surface, longitudinal side edges and lower end and having a battery opening in the rear surface to which a battery for powering the device is received;
at least one circuit board carried by the housing and including radio frequency {RF) circuitry carried by the at least one circuit board and comprising a transmitter and receiver, and a processor carried by the at least one circuit board and operative with the RF circuitry;
an antenna mounted at the lower end of the housing case and operative with the RF circuitry;
a charging circuit mounted within the housing for charging any battery received within the battery opening and comprising opposing charging contacts of opposite polarity carried by the housing at the lower end of the housing case adjacent to said antenna and each charging contact having an exposed surface on the housing and spaced from the at least one circuit board and configured to engage an external charging cradle when connected thereto, each charging contact further comprising an internal connector comprising a lower biased spring connector that extends downward to engage the at least one circuit board and connecting to the charging circuit and any battery for charging same and an upper unbiased connector section that extends upward from the biased spring connector; and
an RF filter associated with each respective charging contact and comprising a cylindrical ferrite material surrounding said upper unbiased connector section of said internal connector at a location adjacent to the respective charging contact to which said RF filter is associated to minimize RF coupling from each charging contact to the antenna and reduce transmitter harmonics emission and receiver de-sense.

12. The mobile wireless communications device according to claim 11, wherein said housing case at the lower end comprises a lower edge and said antenna extends along said lower edge, and said charging contacts are supported on the rear surface of the housing case adjacent to the lower edge to which the antenna extends.

13. The mobile wireless communications device according to claim 12, wherein said antenna comprises an L-shaped antenna extending over the lower edge.

14. The mobile wireless communications device according to claim 11, wherein said housing case comprises an internal surface and further comprising a RF filter support extending therefrom to which said ferrite material is secured.

15. The mobile wireless communications device according to claim 11, wherein said RF circuitry comprises a transceiver chip.

16. The mobile wireless communications device according to claim 11 and further comprising a battery charging pad carried by the at least one circuit board and connected to the charging circuit and the internal connector.

17. The mobile wireless communications device according to claim 11, wherein said RF circuitry is operative for generating Global Systems for Mobile (GSM) packet bursts.

18. A method of operating a mobile wireless communications device, which comprises:

providing a housing, at least one circuit board carried by the housing and including radio frequency (RF) circuitry carried by the at least one circuit board and comprising a transmitter and receiver, a processor carried by the at least one circuit board and operative with the RF circuitry, an antenna mounted within the housing and operative with the RF circuitry, and a charging circuit mounted within the housing for charging a battery carried by and powering the mobile wireless communications device and comprising at least one charging contact carried by the housing and having an exposed surface on the housing and spaced from the at least one circuit board and configured for engaging an external charging cradle when connected thereto, said charging contact further comprising an internal connector comprising a lower biased spring connector that extends downward to engage the at least one circuit board and connecting to the charging circuit and any battery for charging same and an upper unbiased connector section that extends upward from the biased spring connector; and minimizing RF coupling from the at least one charging contact to the antenna while reducing transmitter harmonics emission and receiver de-sense by surrounding the internal connector at a location adjacent to the charging contact of the charging connector with an RF filter formed from a cylindrical ferrite material surrounding and engaging the upper unbiased connector section of the internal connector.

19. The method according to claim 18, which further comprises forming two charging contacts, each having a respective different polarity.

* * * * *